July 2, 1946. H. B. GUSTAFSON ET AL 2,402,960
PROCESS OF CLARIFYING SUGAR SOLUTIONS
Filed July 22, 1942 2 Sheets-Sheet 1
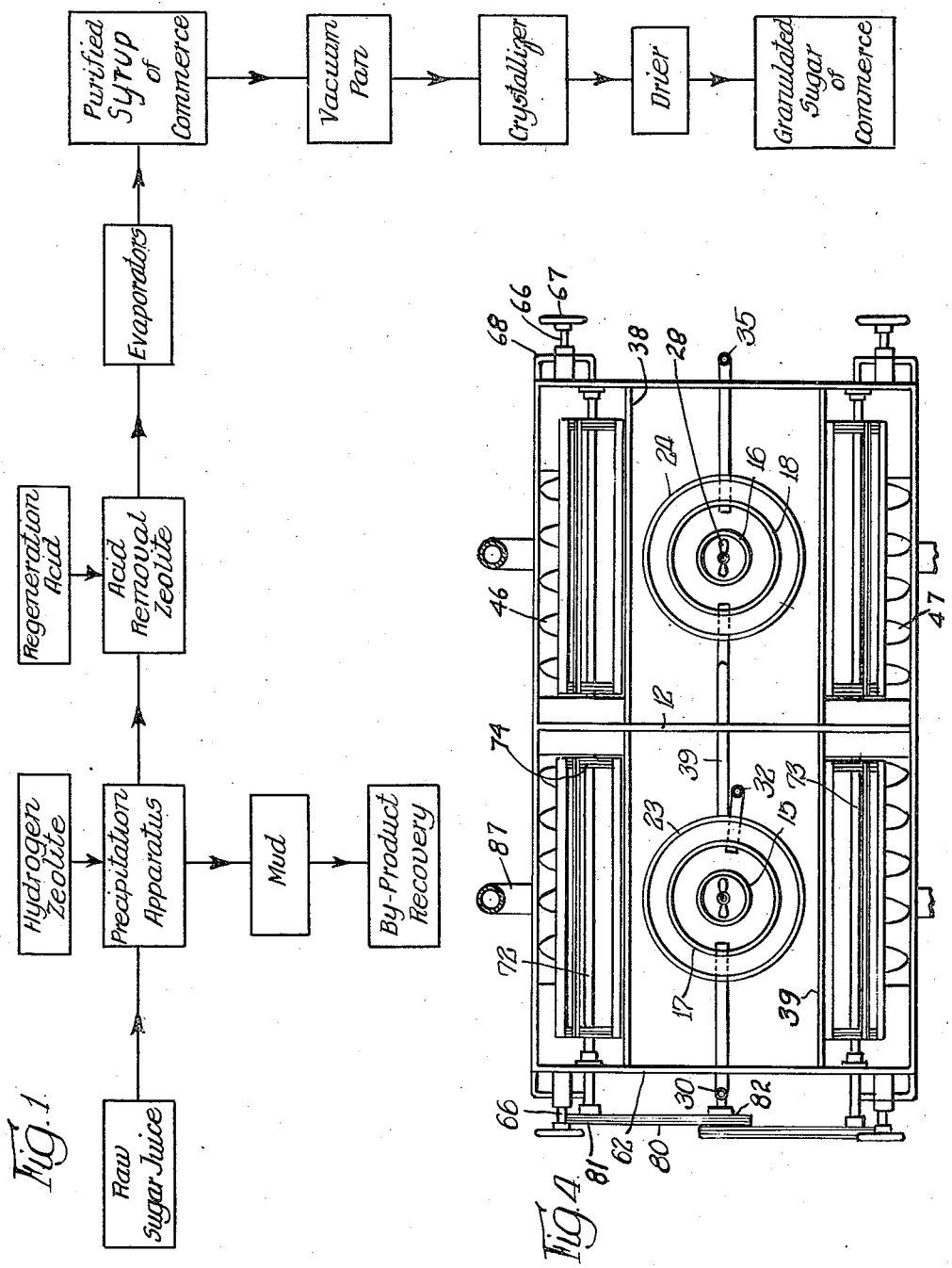
INVENTORS:
Hilding B. Gustafson,
Lewis A. Paley,
BY Robyn Wilcox atty.

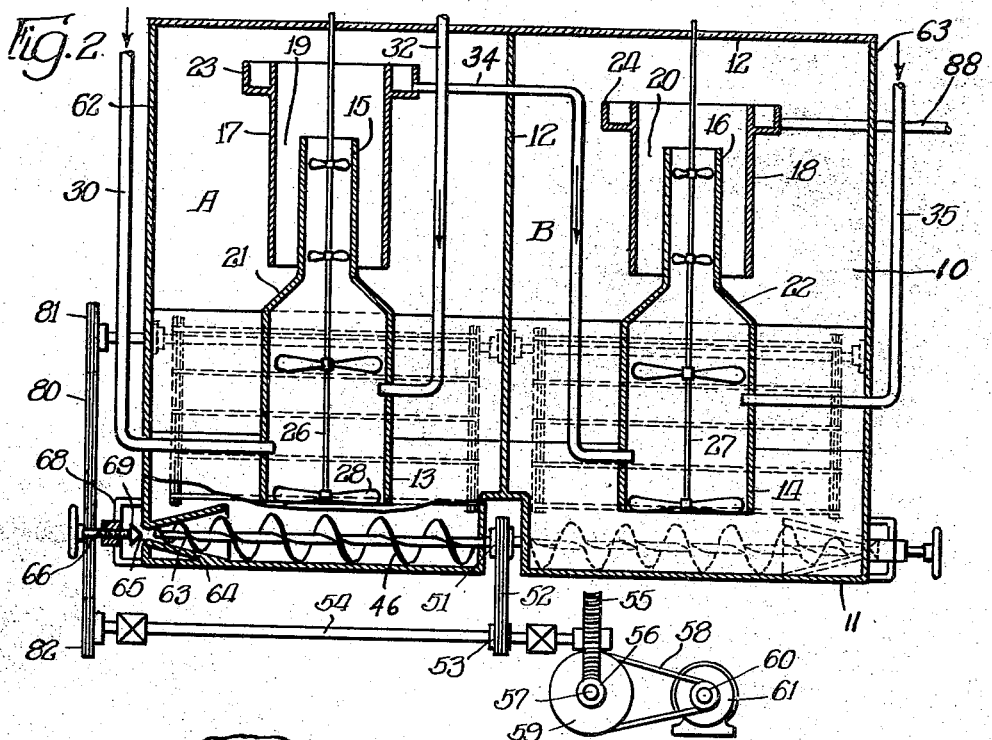
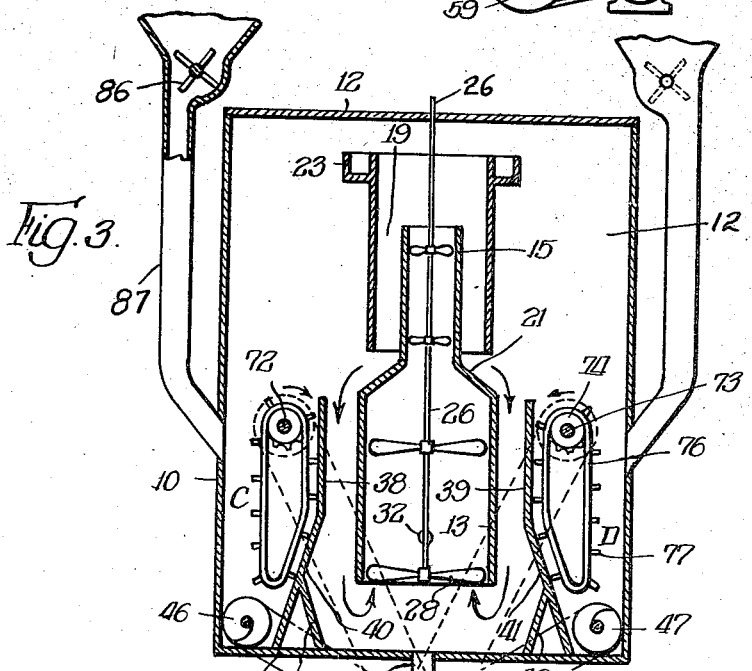

Patented July 2, 1946

2,402,960

UNITED STATES PATENT OFFICE 2,402,960

PROCESS OF CLARIFYING SUGAR SOLUTIONS

Hilding B. Gustafson, Hinsdale, and Lewis A. Paley, Glen Ellyn, Ill., assignors to Infilco Incorporated, Chicago, Ill., a corporation of Delaware Application July 22, 1942, Serial No. 451,950

3 Claims. (Cl. 127—46)

This invention relates to the purification of sugar juices or other solutions containing colloids which may be precipitated by the use of acidic substances.

Sugar juice as derived from the sugar cane by the use of roller presses, and that derived from the sugar beet by the diffusion battery, is subject to inversion or hydrolysis if subjected to elevated temperatures while in an acid condition. Cane sugar juice from the roller mill has some acidity and the beet sugar juice from the diffusion battery has somewhat less acidity. The cane juice contains a substantial amount of invert sugar while the beet juice has little or none. Sugar mill operators guard carefully against causing inversion in their sugar juice and the time honored method of doing this is to raise the pH of the juice by the addition of lime to 8 or 9 or even higher. After this, the practice is to heat the juice as high as to the boiling point to precipitate colloidal matter which occurs in large amounts in the raw juice.

The use of zeolite for the purification of sugar juices has been tried to a limited degree and certain difficulties have arisen due to the large amount of colloidal material present in the raw juice. In water purification, the zeolites are used in column beds and the water is passed through the beds so that exchange can take place between ions present in the water and the ions in the base exchange material. However, in sugar purification the column treatment of the sugar juice is impractical because of the high percentage of colloids present in the juice which quickly plug up the pores of the zeolite bed and render further passage of the juice through the bed impossible. To overcome this difficulty, it has been necessary to give the juice preliminary defecation or purification treatment consisting of raising the pH of the juice or alkalinity through the use of lime, heating the juice, carbonating with carbon dioxide, filtering, followed by a second stage of liming and carbonation and filtering all in an effort to get rid of the colloids which plug up the zeolite bed. Furthermore between the hydrogen exchange bed and the acid removal bed of zeolite, it has been found necessary to use a bed of activated carbon to take out additional colloidal matter which ordinarily would accumulate in the bed of acid-removal material and interfere with its proper regeneration. The resulting process is still quite complicated and requires a large amount of highly skilled labor to operate the various steps in the process and the complicated apparatus required.

We have found that by lowering the pH of the raw juice when first produced, instead of raising its pH and increasing its alkalinity, as is customary, a great volume of dissolved or suspended colloids is immediately precipitated. This precipitation reaction can be considerably improved by mixing with the raw juice a hydrogen carbonaceous zeolite in a suitable type of apparatus which will be subsequently described. The hydrogen carbonaceous zeolite has the ability to remove metal ions such as potassium, calcium, sodium and magnesium ions from the sugar juice and form acids in the juice which lower the pH of the juice and precipitate colloidal matters along with organic acids which are combined with the base metals.

We have found, however, that the precipitate produced in this step of the process is very slimy and exceedingly difficult to filter unless suitable steps are taken to secure its concentration and flocculation. After the juice is properly purified by the addition of hydrogen carbonaceous zeolite and the suitable concentration and removal of the precipitate, the purified juice is passed through an exchange bed of material capable of removing excess acids from the juice. The entire process takes place in a very short time and the juice is maintained in a cold state during the entire process so that no danger of inversion occurs. The hydrogen carbonaceous zeolite which we contemplate using is preferably a low cost product which may be discarded along with the precipitate produced, and may not be subsequently regenerated through the use of acid as is customary with zeolites in granular form supported in filter beds.

An object of this invention therefore is to provide a process for treating sugar juices which will be simple to operate and which will involve a low cost of treating chemicals.

Another object of the invention is to provide a process of treating sugar juices in which the pH of the juice is immediately lowered to precipitate colloidal matter and the juice is kept cold during the entire process to prevent inversion of the sugar.

A further object of the invention is to produce a high purity sugar juice which may be evaporated to a palatable syrup without further purification; also to improve processes for the purification of sugar juice in other respects hereinafter specified and claimed.

Reference is to be had to the accompanying drawings forming a part of this application in which Fig. 1 is a flow diagram showing the steps in the operation of the process, Fig. 2 is a longitudinal central sectional elevation through an apparatus suitable for carrying out our improved process, Fig. 3 is a transverse sectional view through the apparatus, and Fig. 4 is a plan view of the apparatus.

As seen in Fig. 1, the raw juice is sent directly to the precipitation apparatus which will be more fully described, and hydrogen zeolite preferably but not necessarily of the carbonaceous type is fed continuously to the precipitation apparatus. As a result of the reactions described, a voluminous precipitate is formed. This may be removed from the juice in any desired manner together with the zeolite material as described later. The colloidal material is removed from the precipitation apparatus in the form of a stiff mud which requires no filtration because of the special concentrating apparatus which is used. This mud may be treated for the recovery of byproducts of value such as glutamic acid and aconitic acid in the case of cane juice. Potassium sulphate is another byproduct which may be recovered and used for fertilizer.

The clarified sugar juice from the precipitation apparatus may be handled in different ways according to the final product desired, but in our preferred process it passes directly through a bed of a granular material capable of removing acid from the sugar juice. The granular material used in the acid exchange bed is preferably a synthetic resin suitable for producing the desired results, and a number of these resins are sold in commerce. The column of acid removal material eventually loses its capacity of removing acid from the sugar juice and must be regenerated by the use of a dilute alkali. The sugar in the bed is first washed out with water in order to prevent loss of sugar before passing regenerating alkali solution through the bed. The sugar juice after passing through the acid removal material, or anion exchange material as it is sometimes called, is now neutral and free of colloids and ash and is ready to be passed directly to the evaporators and is evaporated to a syrup. This syrup is very light in color and pleasing to the taste so that it may be sold directly as liquid sugar to milk processing plants, bottling works, cereal manufacturers, etc. However, if it is desired to produce a granulated sugar, the purified syrup is further evaporated in the vacuum pan and then sent to the crystallizer. The granulated sugar from the crystallizer is passed through a dryer and is then bagged up for shipment in the usual channels of commerce.

The apparatus for treating the raw sugar juice with hydrogen carbonaceous zeolite shown in Figs. 2, 3 and 4, consists in a tank 10 which is preferably but not necessarily rectangular in form and includes a bottom 11 and a cover 12. The tank 10 is divided into two compartments A and B by a partition 12. Draft tubes 13 and 14 are positioned within the compartments A and B respectively. Each of the draft tubes 13 and 14 is formed with a restricted upper cylinder 15 and 16 respectively and an outer draft tube 17 and 18 extends around each of the cylinders 15 and 16 respectively so as to form spaces 19 and 20 therebetween. Sloping or frusto-conical sections 21 and 22 connect the draft tubes 13 and 14 with the cylinders 15 and 16 respectively. The bottom of draft tubes 17 and 18 extend somewhat above the frusto-conical sections 21 and 22 and the upper ends of the draft tubes 17 and 18 extend above the upper ends of cylinders 15 and 16. An overflow launder 23 is formed adjacent the top of draft tube 17 and a similar launder 24 is formed adjacent the top of draft tube 18. Rotatably mounted within the draft tubes 13 and 14 are shafts 26 and 27 on which are secured a plurality of propellers 28. The shafts 26 and 27 are rotated at a speed of 10 to 40 revolutions per minute by a suitable driving gear not shown. Sugar juice to be treated is introduced into the precipitation chamber A through a pipe 30 which passes through the wall of draft tube 13. Hydrogen carbonaceous zeolite is also introduced into the precipitation chamber A through pipe 32 which passes through the wall of the draft tube 13 somewhat above the pipe 30 so that the sugar juice and the preferably powdered precipitating zeolite are introduced at spaced points in the flow of the fluid in the precipitation chamber A to insure a mixing of the juice with precipitate before mixing with the zeolite. Purified juice overflowing into launder 23 passes through a pipe 34 to the second precipitation chamber B where the pipe extends into the draft tube 14. A pipe 35 extends into the draft tube 14 of the precipitation chamber B somewhat above the pipe 34 and serves for introducing an additional dose of hydrogen carbonaceous zeolite in a second stage treatment of the juice, thereby further lowering the pH of the juice and precipitating further colloids and impurities.

The action of the carbonaceous zeolite on the sugar juice is threefold: (1) the metals of the salts in solution in the sugar juice are taken up by the zeolite and replaced by hydrogen from the zeolite, (2) the acidity in the sugar juice is increased and the pH is lowered so as to precipitate colloids from the sugar juice, and (3) colored bodies in the sugar juice are adsorbed by the carbon in the carbonaceous zeolite. The principal metal in the sugar juice is potassium and part of the potassium is combined with organic acids. The liberation of the organic acids causes them in general to precipitate.

The result of all of these actions on the sugar juice by the carbonaceous zeolite is to produce a slimy precipitate or sludge which is rather difficult to filter and is of low concentration, that is, the amount of dry solids in the sludge is rather low. In order to concentrate this precipitate, longitudinal upright partitions 38 and 39 are formed in the precipitation chambers A and B, the partitions 38 and 39 terminating at their lower end in inclined partitions 40 and 41. Inclined filler plates 42 and 43 are attached to the partitions 40 and 41. The action of the propellers 28 is to cause a constant circulation of the precipitate and the sugar juice under treatment so that precipitation takes place directly in contact with previously formed particles of precipitate thus tending to produce larger flocs or more concentrated precipitate. When the precipitate or slurry level builds up slightly above the top of concentrator partitions 38 and 39, a certain percentage of the precipitate overflows into concentrator chambers C and D. A conveyor screw 46 and 47 is rotatably mounted in the bottom of each concentrator chamber C and D respectively. It will be noted that the screw conveyors 46 and 47 are in two sections, one left-hand and one right-hand. A sprocket wheel 51 is mounted on the shaft 50 to drive the screw conveyors. Chain 52 connects the sprocket 51 to a sprocket 53 mounted on a shaft 54. A worm wheel 55 is secured to one end of shaft 54 and meshes with a worm 56 which is mounted on a worm shaft 57. A belt 58 connects a pulley 59 to a pulley 60 on the shaft of a motor 61. The action of the driving mechanism described is to slowly convey the precipitate in the bottom of concentrator chambers C and D to the end walls 62 and 63 of precipitation chambers A and B. The body of each screw conveyor 46 and 47 is of relatively long pitch while the ends of said screw conveyor have a relatively short pitch and are also tapered towards the end to fit within a frusto-conical sleeve 64, which terminates in an outer valve seat 65. A threaded valve stem 66 having an operating handle 67 engages a threaded opening in a bracket 68, the valve stem 66 having a conical valve 69 registering with the valve seat 65.

In order to insure that all the slimy precipitate is delivered downwardly to the screw conveyors 46 and 47, especially along the inclined partitions 40 and 41, we provide rotatably mounted scraper shafts 72 and 73 which pass through the precipitation chambers A and B above each of the concentrator chambers C and D. A plurality of sprockets 74 are secured to the scraper shafts 72 and 73 and scraper chains 76 are suspended from the sprockets 74. Scraper bars 77 connect each pair of chains 76 and are arranged to slide along the inside of partitions 38, 39, 40 and 41 as the shafts 72 and 73 rotate. A chain 80 connects a sprocket wheel 81 on each of the shafts 72 and 73 to a sprocket wheel 82 on shaft 54 so that the scrapers will always rotate when the concentrating screws are rotating. The action of the tapered section on the screw conveyors 46 and 47 is to concentrate the precipitate still further by squeezing the sugar juice out of the precipitate, the juice remaining in the precipitation tanks A and B. The stiffness or consistency of the mud delivered by the screws 46 and 47 is regulated by the position of the valve 69, relative to its valve seat 65, thus regulating the back pressure on the mud discharge apparatus. Fibrous material, such as comminuted bagasse or beet pulp may be introduced if desired into each concentrator chamber C and D by a star feeder 86 and pipe 87 so as to give more body to the precipitate and secure a better squeezing action of the screws in sleeves 64. As an alternate sludge concentration means, we may use a suitable centrifuge, not shown, of the type used for separating liquids from solids. Drain 85 is provided in the bottom of each precipitation chamber or cell A and B. Purified juice from cell B passes from launder 24 through a pipe 88 to a point of use or to a third cell. While the invention may be carried out in a single compartment precipitation chamber, greater flexibility and higher purity of juice is obtained by using a double or treble precipitation chamber. Thus a limited amount of hydrogen zeolite is admitted into precipitation chamber A so as to lower the pH of the sugar juice to about 3.0 to 4.0. This amount of acidity will precipitate the bulk of the colloids in the sugar juice which are very sensitive to lowering of the pH. The second dose of hydrogen zeolite introduced into precipitation chamber B causes a further lowering of the pH in said chamber B to possibly 1.5 to 2.0. This second dose of hydrogen zeolite also withdraws the balance of the metals from the sugar juice. If sufficient acid is not produced from the metal salts available in the sugar juice, it may be desirable to also add free acid through pipe 35 to precipitation chamber B along with the carbonaceous zeolite in order to lower the pH of the juice to the desired extent. The acid used at this final stage in the precipitation process may be phosphoric acid or any other desired acid. The entire process takes place in the cold to prevent inversion of the sugar under the prevailing acid conditions, a maximum temperature of 50° C. or less being employed. The acid conditions and rapid motion during the process serve to keep the bacteria and molds in the juice to a minimum until such time as the juice is purified and sent to the evaporators where the heat completes the sterilization of the juice. As indicated heretofore, the acid clarified juice from the second cell is preferably treated with an acid adsorption, or anion exchange, material to remove acidity prior to evaporation.

Alternate forms of the process are described as follows:

Process 2

Using the two-cell compound precipitating apparatus or unit, we would add phosphoric acid to the first cell in amounts sufficient to precipitate the colloids. The colloids are easily precipitated by a slight lowering of pH so that a large amount of phosphoric acid will not be required. The slimy colloidal mud from the first cell is discharged by screw action. The effluent from the first unit is passed into the second unit and hydrogen carbonaceous zeolite is introduced into the second unit to remove metal ions from the sugar juice. As this zeolite in the second cell is not plugged up with colloids from the juice, it may be discharged from the second cell by screw action and regenerated to be returned again to the system. It will be understood that the acid contained in the clarified juice passing from the second cell B can be removed by treating the juice with an anion exchange, or acid adsorption material as it is sometimes called, whereupon the juice can be evaporated in the ordinary manner.

Process 3

The third process consists in adding a third cell to the equipment of Processes 1 or 2 and in the third cell is added a resinous acid adsorbing material to adsorb all acids from the sugar juice and deliver a pure juice free of ash and acid suitable for evaporation down to a palatable syrup or liquid sugar. This acid absorbing material may be continuously delivered from the third cell to be regenerated by the use of an alkali solution and returned for re-use in the third cell.

Process 4

Two cells are used and powdered hydrogen carbonaceous zeolite is introduced into the sugar juice in the first cell to precipitate colloids, remove metal ions from the salts and to adsorb colored bodies. The purified juice from the first cell is passed to the second cell and acid adsorbing material is continuously introduced into the juice to remove all free acid from the juice and provide a juice which is suitable for evaporation to a palatable syrup or liquid sugar.

We would state in conclusion that while the illustrated examples constitute practical embodiments of our invention, we do not limit ourselves precisely to these details, since manifestly, the same may be considerably varied without departing from the spirit of the invention as defined in the appended claims.

Having thus described our invention, we claim as new and desire to secure by Letters Patent:

1. The process of producing purified sugar juice, which comprises mixing the raw juice in a rapidly circulating body of previously formed precipitate with an amount of hydrogen zeolite sufficient to reduce the pH of the juice to between 1.5 and 4.0; withdrawing a portion of said precipitate from said circulating body, concentrating said precipitate, withdrawing a clarified portion of juice from said circulating body and treating said withdrawn juice with an anion exchange material.

2. The process of producing a purified sugar juice, which comprises mixing the raw juice in a rapidly circulating body of partially spent hydrogen zeolite with an amount of fresh hydrogen zeolite sufficient to reduce the pH of the juice to between 1.5 and 4.0 so as to precipitate colloids, remove metal ions and adsorb colored bodies, separating the precipitated matter from said juice, passing said zeolite treated juice to a second station and mixing anion exchange material with said juice in a rapidly circulating body of partially spent anion exchange material, and evaporating said purified juice to a syrup.

3. The process of purifying a raw sugar juice, which comprises the steps in sequence of first mixing the raw juice with a rapidly circulating suspension comprising a body of juice undergoing treatment containing precipitate accumulated from previously treated juice and an amount of hydrogen zeolite sufficient to reduce the pH of the juice to within the range of about 3.0 to 4.0 and thereby precipitating colloids, separating clarified juice from said circulating suspension, passing the separated juice into a second body of rapidly circulating suspension comprising juice undergoing treatment containing precipitate accumulated from previously treated juice and an amount of hydrogen zeolite sufficient to reduce the pH of the juice to between 1.5 and 2.0, separating clarified juice from said circulating juice and treating said juice with an anion exchange material to produce a purified sugar juice capable of evaporation to a purified syrup.

HILDING B. GUSTAFSON.
LEWIS A. PALEY.